(12) United States Patent
Li et al.

(10) Patent No.: US 9,599,099 B2
(45) Date of Patent: Mar. 21, 2017

(54) THERMAL-POWERED DEVICE USING MEMORY ALLOY SHEETS

(75) Inventors: Tongqiang Li, Hangzhou (CN); Xiaoning Jiang, Hangzhou (CN)

(73) Assignee: ZHEJIANG GONGSHANG UNIVERSITY, Hangzhou, Zhejiang (CN)

( * ) Notice: Subject to any disclaimer, the term of this patent is extended or adjusted under 35 U.S.C. 154(b) by 325 days.

(21) Appl. No.: 14/343,397

(22) PCT Filed: Jun. 21, 2012

(86) PCT No.: PCT/CN2012/077389
§ 371 (c)(1),
(2), (4) Date: Mar. 7, 2014

(87) PCT Pub. No.: WO2013/044654
PCT Pub. Date: Apr. 4, 2013

(65) Prior Publication Data
US 2014/0223900 A1 Aug. 14, 2014

(30) Foreign Application Priority Data

Sep. 29, 2011 (CN) .......................... 2011 1 0291101

(51) Int. Cl.
*F03G 7/06* (2006.01)

(52) U.S. Cl.
CPC ................... *F03G 7/065* (2013.01)

(58) Field of Classification Search
CPC ................... F03G 7/06; F03G 7/065
USPC ...... 60/527–529; 415/2.1–8; 290/42, 43, 53, 290/54
See application file for complete search history.

(56) References Cited

U.S. PATENT DOCUMENTS

| 1,258,368 | A | * | 3/1918 | Smith | ...................... F03G 7/06 310/307 |
| 3,430,441 | A | * | 3/1969 | Adams | ...................... F03G 7/06 60/529 |
| 3,913,326 | A | * | 10/1975 | Banks | ..................... F03G 7/065 60/527 |
| 4,030,298 | A | * | 6/1977 | Sandoval | ............... F03G 7/065 60/527 |
| 4,037,411 | A | * | 7/1977 | Hochstein | ............... F03G 7/065 60/527 |

(Continued)

FOREIGN PATENT DOCUMENTS

JP  WO 8201400 A1 * 4/1982 ............... F03G 3/00

*Primary Examiner* — Thomas Denion
*Assistant Examiner* — Laert Dounis
(74) *Attorney, Agent, or Firm* — Muncy, Geissler, Olds & Lowe, P.C.

(57) ABSTRACT

The present invention discloses a device capable of converting thermal energy into kinetic energy, in particular a thermal-powered device, including a housing (1) and a transmission device (2) disposed in the housing (1). Alloy sheets (3) are disposed at the transmission device (2). The housing (1) is formed with a heat source interface (6). In the present invention, thermal energy or other energy in the automobile exhaust gas is converted into kinetic energy output by virtue of the memory function of memory alloys, thus reducing emission of greenhouse gas, protecting the atmosphere environment, and conforming to the strategies and policies of economy of energy, environmental protection, and harmonious development between man and nature.

7 Claims, 1 Drawing Sheet

(56) References Cited

U.S. PATENT DOCUMENTS

| | | | | |
|---|---|---|---|---|
| 4,260,325 A | * | 4/1981 | Cymara | F03D 3/0481 |
| | | | | 415/4.4 |
| 4,490,976 A | * | 1/1985 | Johnson | C22F 1/006 |
| | | | | 60/527 |
| 4,684,817 A | * | 8/1987 | Goldwater | F03D 3/067 |
| | | | | 290/55 |
| 2012/0216524 A1 | * | 8/2012 | Browne | F03G 7/065 |
| | | | | 60/527 |
| 2014/0223905 A1 | * | 8/2014 | Li | F03G 7/065 |
| | | | | 60/641.8 |

* cited by examiner

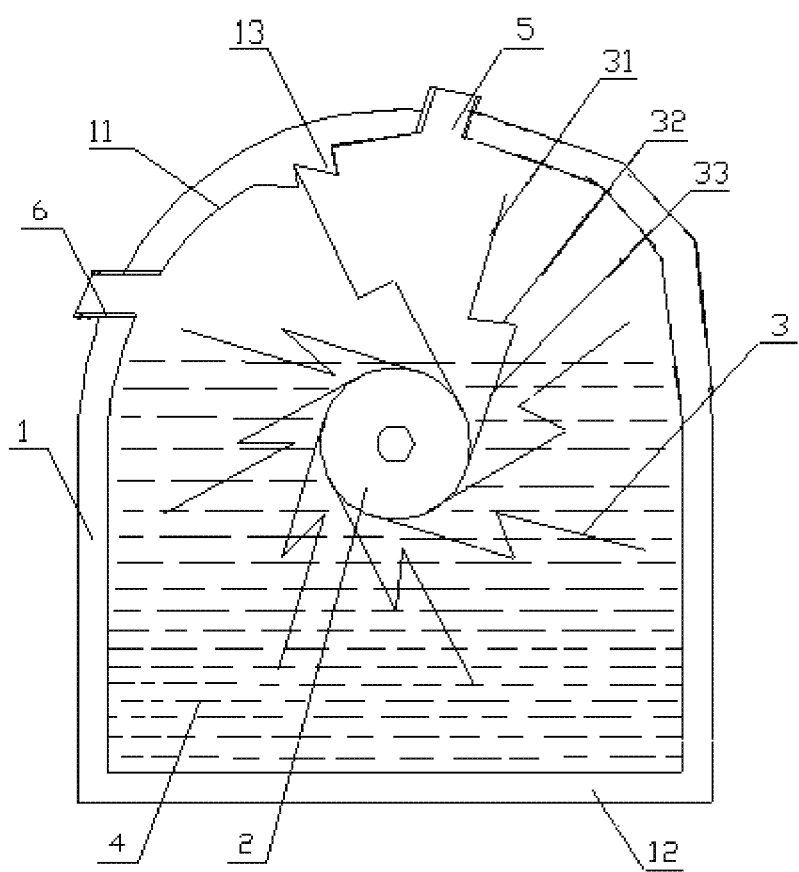

THERMAL-POWERED DEVICE USING MEMORY ALLOY SHEETS

BACKGROUND OF THE INVENTION

Field of the Invention

The present invention relates to a device for converting thermal energy into kinetic energy, in particular to a thermal-powered device.

Description of the Related Art

Along with worldwide economic development, energy consumption has also increased tremendously. At present, the world economic development involves great risks due to severe imbalance between supply and demand and soaring prices for petroleum-based energy sources and the worldwide economic recession. Therefore, people have started to focus on the development and utilization of new energies. Industrial waste gas, such as thermal energy in automobile exhaust gas, is usually neglected. Directly discharging those thermal energies into the atmosphere does not only pollute the environment to a certain extent, but also causes waste.

BRIEF SUMMARY OF THE INVENTION

In the prior art, waste gas generated in the industrial production and automobile exhaust gas are discharged into the atmosphere directly, causing atmospheric pollution and greenhouse effect. Aiming at the shortages of traditional energy such as petroleum and shortcomings such as atmospheric pollution and greenhouse effect resulting from the direct discharge of the industrial waste gas and automobile exhaust gas into the atmosphere in the prior art, the present invention provides an energy-saving and environmentally-friendly thermal-powered device which effectively converts the heat in the industrial waste gas and automobile exhaust gas into kinetic energy output through the memory function of the memory alloy, generating energy through the waste gas and protecting the environment at the same time.

To solve the mentioned technical problem, the present invention is realized by the following technical solution.

A thermal-powered device includes a housing and a transmission device disposed in the housing. Eight or more alloy sheets are disposed at the transmission device, and the housing is formed with a heat source interface and a vent. The transmission device is disposed in the housing, and is connected to the alloy sheets, thus preventing the entry of external impurities, reducing abrasion of the transmission device, and prolonging the service life of the device. The industrial waste gas or automobile exhaust gas can be directly introduced to the thermal-powered device through the heat source interface on the housing. The thermal-powered device converts the heat in the industrial waste gas or automobile exhaust gas into kinetic energy output, thereby reducing the emission of gasses resulting in the greenhouse effect, protecting the atmospheric environment, and conforming to the strategies and policies of energy-saving, environmentally-friendly, and low-carbon development.

Preferably, each of the alloy sheets is a panel forming a first bent panel and a second bent panel through anticlockwise rotating an angle greater than or equal to 90°; the second bent panel forms a third panel through clockwise rotating an angle greater than or equal to 90°; and the first bent panel of each bent alloy sheet is parallel to a plane where the third bent panel is located. The alloy sheets are of memory alloys, folded twice, so each heated alloy sheet may restore the original extending and expanding state. During extending and expanding, each alloy sheet is blocked by a baffle shell at the upper part of the housing and acts on the baffle shell, and the baffle shell applies a counterforce to thrust each alloy sheet to rotate. When plural alloy sheets act in sequence, a substantial change occurs and the alloy sheets drive the transmission device to rotate.

Preferably, the alloy sheets are fixedly connected to the transmission device. The first bent panel of each alloy sheet is tangent to the circle formed by the axial projection of the transmission device. Each alloy sheet is tangent to the transmission device, so each thermally expanded alloy sheet acts on the baffle shell. The baffle shell applies a counterforce to each alloy sheet after being extruded by each alloy sheet, consequently generating a torque and thrusting the transmission device to rotate. An arc-shaped bend is disposed at the end of each alloy sheet. The alloy sheets are made of memory alloys, so the folded alloys have a "memory" function, and may naturally expand and restore their original extending state when heated. The arc-shaped bend contacts with and acts on the baffle shell at the upper part of the housing when each alloy sheet restores the original state. Then, the baffle shell applies a counterforce to the arc-shaped bend on each alloy sheet, thereby thrusting each alloy sheet to rotate.

Preferably, the upper part of the housing is the baffle shell contacting each thermally expanded alloy sheet, and the lower part of the housing is a solution shell filled with coolant.

Preferably, each alloy sheet is of memory alloys. The memory alloy is a kind of martensite phase transformation alloy featuring regular atom arrangement and volume change of less than 0.6%. This kind of alloy may deform by the action of an external force, and can restore the original state at a certain temperature when the external force is removed. It can restore millions of times, and is therefore called "memory alloy". Of course, it cannot function as a human brain, so more accurately, it should be called "shape memorizing alloy". In addition, the memory alloy also has advantages of non-magnetism, wear-resistance, corrosion resistance, and non-toxicity, and therefore is widely applied. The alloy sheets may be of titanium-nickel alloys, gold-cadmium alloys, or copper-zinc alloys.

Preferably, the transmission device includes a rotating shaft. The alloy sheets are fixedly connected to the rotating shaft. The transmission device includes the rotating shaft, and the alloy sheets are fixedly connected to the rotating shaft, so when plural alloy sheets rotate, the rotating shaft is driven to rotate and outputs the energy generated by the alloy sheets.

Preferably, the baffle shell at the upper part of the housing is formed with a heat source interface. The radial length of each bent alloy sheet is smaller than the distance between the baffle shell and the transmission device. The radial length of each thermally expanded alloy sheet is greater than the distance between the baffle shell and the transmission device. The depth of the solution shell is greater than the radial length of each thermally expanded alloy sheet. Thus, each alloy sheet can be completely immersed in the solution shell and does not contact with the inner wall of the solution shell.

Preferably, eight or more of the alloy sheets are uniformly distributed and geometrically centered on the transmission device.

Preferably, a heat insulation coating is applied to the inner wall of the housing, and a ratchet is disposed at the inner wall of the baffle shell. The heat insulation coating applied to the inner wall of the housing prevents loss of heat in the housing, so the heat entering into the housing through the heat source interface is completely used. A ratchet is disposed at the inner wall of the baffle shell. Waste thermal energy such as heat in the automobile exhaust gas is conveyed into the housing through the heat source interface such that the alloy sheets are heated to expand and then thrust the transmission device to rotate. The ratchet controls the rotation direction.

The present invention provides an energy-saving and environmentally-friendly thermal-powered device which effectively converts the heat in the industrial waste gas and automobile exhaust gas into kinetic energy output through the memory function of the memory alloy, generating energy through the waste gas and protecting environment at the same time. The generated energy is clean and regenerative, which has a great significance for protection of the environment, development and utilization of the new energy.

These and other features, aspects, and advantages of the present invention will become better understood with regard to the following description, appended claims, and accompanying drawings.

BRIEF DESCRIPTION OF THE DRAWINGS

FIG. 1 is a structural view according to an embodiment one of the present invention, wherein 1-housing, 2-transmission device, 3-alloy sheet, 4-coolant, 5-vent, 6-heat source interface, 11-baffle shell, 12-solution shell, 13-ratchet, 31-first bent panel, 32-second bent panel, 33-third bent panel.

DETAILED DESCRIPTION OF THE INVENTION

This invention is described in further details with reference to the attached drawing and the embodiments together.

EXAMPLE 1

As shown in FIG. 1, a thermal-powered device includes a housing 1 and a transmission device 2 disposed in the housing 1. Eight alloy sheets 3 are disposed at the transmission device 2, and the housing 1 is formed with a heat source interface 6 and a vent 5. The industrial waste gas or automobile exhaust gas can be directly introduced to the thermal-powered device through the heat source interface on the housing. The thermal-powered device converts the thermal energy in the industrial waste gas or automobile exhaust gas into kinetic energy output, thereby reducing emission of greenhouse gasses, protecting the atmospheric environment, and conforming to the strategies and policies of energy-saving, environmentally-friendly, and low-carbon development.

Each alloy sheet 3 is a panel forming a first bent panel 31 and a second bent panel 32 through anticlockwise rotating an angle greater than or equal to 90°; the second bent panel 32 forms a third bent panel 33 through clockwise rotating an angle greater than or equal to 90°; and the first bent panel 31 of each bent alloy sheet 3 is parallel to a plane where the third bent panel 33 is located. The alloy sheets 3 are of memory alloys, folded twice. After being heated, the alloy sheets 3 restore the original extending and expanding state. During extending and expanding, each alloy sheet 3 is blocked by a baffle shell 11 at the upper part of the housing 1 and acts on the baffle shell 11, and the baffle shell 11 applies a counterforce to thrust each alloy sheet 3 to rotate. When plural alloy sheets 3 act in sequence, a substantial change occurs and the alloy sheets 3 drive the transmission device to rotate. The alloy sheets 3 are fixedly connected to the transmission device 2. The first bent panel 31 of each alloy sheet 3 is tangent to the circle formed by the axial projection of the transmission device 2. Each alloy sheet is tangent to the transmission device, so each thermally expanded alloy sheet acts on the baffle shell. The baffle shell applies a counterforce to each alloy sheet after being extruded by each alloy sheet, consequently generating a torque and thrusting the transmission device to rotate.

The upper part of the housing 1 is the baffle shell 11 contacting with the thermally expanded alloy sheets 3, and the lower part of the housing 1 is a solution shell 12 filled with coolant 4. When rotating to the lower half part of the housing 1, each alloy sheet 3 contacts with the coolant 4 in the solution shell 12. Cooled by the coolant 4, each alloy sheet 3 restores the original bent state. The alloy sheets 3 are of memory alloys such as titanium-nickel alloys. The baffle shell 11 at the upper part of the housing 1 is formed with the heat source interface 6 and the vent 5. The radial length of each bent alloy sheet 3 is smaller than the distance between the baffle shell 11 and the transmission device 2. The radial length of each thermally expanded alloy sheet 3 is greater than the distance between the baffle shell 11 and the transmission device 2. The depth of the solution shell 12 is greater than the radial length of each thermally expanded alloy sheet 3.

The transmission device 2 includes a rotating shaft. The alloy sheets 3 are fixedly connected to the rotating shaft. The transmission device 2 includes the rotating shaft, and the alloy sheets 3 are fixedly connected to the rotating shaft, so when plural alloy sheets 3 rotates, the rotating shaft is driven to rotate and outputs the energy generated by the alloy sheets 3. Eight or more of the alloy sheets 3 are uniformly distributed and geometrically centered on the transmission device 2.

A heat insulation coating is applied to the inner wall of the housing 1. A ratchet 13 is disposed at the inner wall of the baffle shell 11. The ratchet 13 with the locking function is disposed at the housing 1, so each alloy sheet 3 is limited to clockwise rotate. During thermal expansion, each alloy sheet 3 thrusts the transmission device 2 to clockwise rotate, and the clockwise rotation of the transmission device 2 drives the alloy sheets 3 disposed at the transmission device 2 to synchronously clockwise rotate. In this way, the whole thermal-powered device rotates, and outputs power through the rotating shaft. The heat insulation coating applied to the inner wall of the housing 1 prevents loss of heat in the housing 1, so the heat entering into the housing 1 through the heat source interface 6 is completely used.

After heat sources such as the automobile exhaust gas and industrial waste gas are input through the heat source interface 6, the memory alloy sheets 3 are heated to expand and then inevitably extend, thereby extruding the metal housing 1. The metal housing 1 is made of extremely hard metal and does not deform due to extrusion. On the contrary, the metal housing 1 applies a counterforce to the memory alloy sheets 3. The counterforce acts on the rotating shaft connected to the transmission device through the memory alloy sheets 3 and then thrusts the rotating shaft to rotate. The metal housing 1 is structured to have a smaller upper half part and a bigger lower half part. When rotating to the bottom, the memory alloy sheets 3 are immersed in the metal coolant 4 and then shrink to prepare for thermal expansion in the next cycle. Thus, the rotating shaft connected to the transmission device rotates continuously based on input of the heat source, providing power for the transmission device continuously.

EXAMPLE 2

As shown in FIG. 1, a thermal-powered device includes a housing 1 and a transmission device 2 disposed in the housing 1. Sixteen alloy sheets 3 are disposed at the transmission device 2, and the housing 1 is formed with a heat source interface 6 and a vent 5.

Each alloy sheet 3 is a panel forming a first bent panel 31 and a second bent panel 32 through anticlockwise rotating an angle greater than or equal to 90°; the second bent panel 32 forms a third bent panel 33 through clockwise rotating an angle greater than or equal to 90°; and the first bent panel 31 of each bent alloy sheet 3 is parallel to a plane where the third bent panel 33 is located. The alloy sheets 3 are of memory alloys, folded three times. Each alloy sheet 3 heated by a heat source restores the original extending and expanding state. During extending and expanding, each alloy sheet 3 is blocked by a baffle shell 11 at the upper part of the housing 1 and acts on the baffle shell 11, and the baffle shell 11 applies a counterforce to thrust each alloy sheet 3 to rotate. When plural alloy sheets 3 act in sequence, a substantial change occurs and the alloy sheets 3 drive the transmission device to rotate. An arc-shaped bend is disposed at one end of each alloy sheet 3 close to the housing 1. The alloy sheets 3 are fixedly connected to the transmission device 2. The first bent panel 31 of each alloy sheet 3 is tangent to the circle formed by the axial projection of the transmission device 2. Each alloy sheet is tangent to the transmission device, so each thermally expanded alloy sheet acts on the baffle shell. The baffle shell applies a counterforce to each alloy sheet after being extruded by each alloy sheet 3, consequently generating a torque and thrusting the transmission device to rotate. An arc-shaped bend is disposed at the end of each alloy sheet 3. Each alloy sheet 3 is of memory alloys, so each folded alloy sheet 3 has a "memory" function, and may naturally expand and restore the original extending state when heated. The arc-shaped bend contacts with and acts on the baffle shell 11 at the upper part of the housing 1 in the restoration process. Then, the baffle shell 11 applies a counterforce to the arc-shaped bend on each alloy sheet 3, thereby thrusting each alloy sheet 3 to rotate.

The upper part of the housing 1 is the baffle shell 11 contacting the thermally expanded alloy sheets 3, and the lower part of the housing 1 is a solution shell 12 filled with coolant 4. When rotating to the lower half part of the housing 1, each alloy sheet 3 contacts the coolant 4 in the solution shell 12. Cooled by the coolant 4, each alloy sheet 3 restores the original bent state. The alloy sheets 3 are of memory alloys such as copper-zinc alloys.

The transmission device 2 includes a rotating shaft. The alloy sheets 3 are fixedly connected to the rotating shaft. The transmission device 2 includes the rotating shaft, and the alloy sheets 3 are fixedly connected to the rotating shaft, so when plural alloy sheets 3 rotate, the rotating shaft is driven to rotate and output the energy generated by the alloy sheets 3.

Sixteen alloy sheets 3 are uniformly distributed and geometrically centered on the transmission device 2. A heat insulation coating is applied to the inner wall of the housing 1. A ratchet 13 is disposed at the inner wall of the baffle 11.

The heat insulation coating applied to the inner wall of the housing 1 prevents loss of heat in the housing 1, so the heat entering into the housing 1 through the heat source interface 6 is completely used.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A thermal-powered device, comprising:
a housing;
a transmission device contained within the housing;
a plurality of memory alloy sheets, each connected to the transmission device at one end and extending toward the housing at the other end and formed from first, second and third panels, the first panel connected to the transmission device at a first end, a first end of the second panel connected to a second end of the first panel at a first angle of at least 90 degrees and a first end of the third panel connected to a second end of the second panel at a second angle of at least 90 degrees, so that the first and third panels are parallel; and
a heat source interface for transmitting heat into the housing;
the memory alloy sheets changing the first and second angles and expanding in length when subject to the heat from the heat source interface to contact the housing and apply force to the transmission device.

2. The thermal-powered device according to claim 1, wherein the memory alloy sheets are fixedly connected to the transmission device, and the first panel of each memory alloy sheet is tangent to a circle formed by an axial projection of the transmission device.

3. The thermal-powered device according to claim 1, wherein an upper part of the housing is a baffle shell for contacting with the expanded memory alloy sheets, and a lower part of the housing is a solution shell filled with coolant.

4. The thermal-powered device according to claim 1, wherein the transmission device comprises a rotating shaft, and the memory alloy sheets are fixedly connected to the rotating shaft.

5. The thermal-powered device according to claim 3, wherein the baffle shell includes the heat source interface, a radial length of the memory alloy sheet when unheated is smaller than a distance between the baffle shell and the transmission device, while the radial length of the heated memory alloy sheet is greater than the distance between the baffle shell and the transmission device, and a depth of solution shell is greater than the radial length of the heated memory alloy sheet.

6. The thermal-power tool device according to claim 1, wherein the memory alloy sheets are uniformly distributed and geometrically centered on the transmission device.

7. The thermal-powered device according to claim 3, wherein a heat insulation coating is applied to the inner wall of the housing, and a ratchet is disposed at an inner wall of the baffle shell.

* * * * *